July 1, 1930.  C. W. STANCLIFFE  1,769,808
HEAT EXCHANGE APPARATUS
Filed Nov. 2, 1927
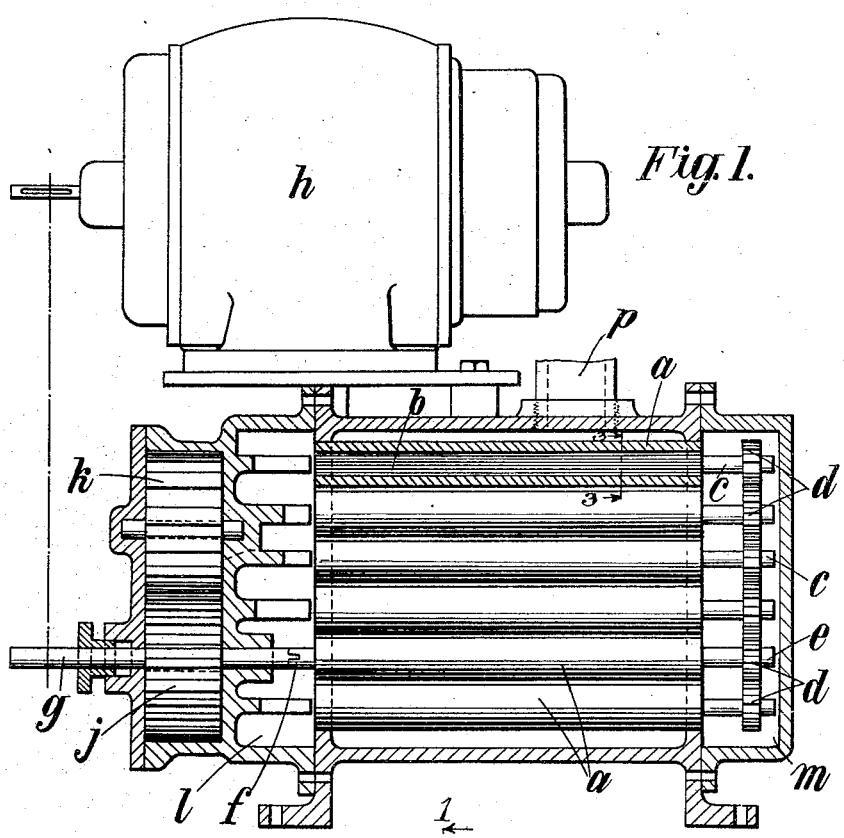
Fig. 1.
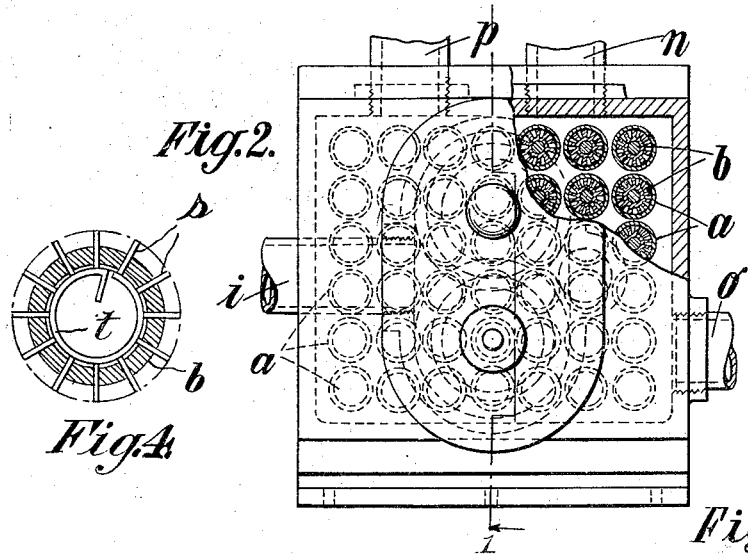
Fig. 2.
Fig. 4.
Fig. 3.
INVENTOR
C. W. Stancliffe
BY
ATTORNEY Patented July 1, 1930

1,769,808

UNITED STATES PATENT OFFICE

CECIL WHEATLEY STANCLIFFE, OF ALDWYCH, LONDON, ENGLAND

HEAT-EXCHANGE APPARATUS

Application filed November 2, 1927, Serial No. 230,593, and in Great Britain November 12, 1926.

This invention relates to apparatus for the heating and cooling of fluids and has for its primary object to provide improved apparatus whereby the transfer of heat may be effected in a more efficient manner than hitherto.

To save repetition, the term heating will be used in the remainder of the specification to include the operations of cooling and heating.

It is well-known that in the transfer of heat to fluids through metal tubes or other appliances there is a marked delay in heat transfer at the surface and that particles of the fluid tend to adhere to the surface and thus impede the transfer of heat; these phenomena occur with all fluids and are particularly prevalent in the case of heavy and viscous liquids.

A further object of the invention is to provide a heat transfer apparatus in which mechanical means are provided for causing the fluid to be heated to be pressed in thin films against the heating surfaces.

A further object of the invention is to provide a heat transfer apparatus comprising a series of grooved rollers which are caused to rotate in internal contact with tubes over which heating fluid is passed, the fluid to be heated passing axially along the grooves in the rollers and being constantly wiped across and squeezed against the heated tube.

With these and other objects in view the invention consists in the novel arrangements and combination of apparatus hereinafter described in detail and specifically enumerated in the appended claims.

In the accompanying drawings which illustrate the invention,

Fig. 1 is a view in section, partly in elevation, of the improved apparatus, the line of section being line 1—1 of Fig. 2.

Fig. 2 represents an end view, partly broken out of the apparatus shown in Fig. 1, with the motor removed.

Fig. 3 is a section on line 3—3 of Fig. 1.

Fig. 4 is a cross section of a modified form of roller.

Referring now to the drawings, the fluid to be heated is driven by a pump through a series of parallel tubes $a$ in which are rotated a series of ribbed rollers or rotors $b$ which make contact with the internal surfaces of the tubes.

These rollers are mounted upon shafts $c$ which are inter-geared by pinions $d$ the shaft $e$ of one being driven through a dog clutch $f$ from the shaft $g$ which is driven through belt or chain from a motor $h$.

The fluid to be heated, for example oil, enters through a pipe $i$ and is driven by geared pump wheels $j$, $k$ into the space $l$; thence through the grooves in the rollers into the rear space $m$ and passes out by a pipe $n$; the heating fluid, for example water, enters by the pipe $o$, passes between the tubes $a$ and out by the pipe $p$.

In this form of apparatus the fluid to be heated flows axially along the grooves in the rollers and is constantly pressed against the internal surfaces of the heated tubes. This ensures that the heating surfaces of the tubes shall be continuously in contact with different portions of fluid to be heated and kept continuously clean thus preventing the formation of a sticky heat-insulating deposit which tends to form when oil and other fluids flow through heated tubes.

Any suitable form of grooved roller can be employed and if preferred the grooves may be of spiral form and may be provided by a number of blades projecting radially from the rollers or splined thereto and pressing against the tubes. Fig. 4 shows a modified form of roller in which blades $s$ project radially from the rotors $b$. A spring $t$ is arranged behind the blades to keep them continuously pressed outward so that they engage the inner surface of the tube yieldingly. The blades $s$ may be in short lengths, thus enabling contact to be made with the inner surfaces of the tubes even if slight variations in diameter occur.

It is to be understood that the invention is not restricted to the exact details shown and described but embraces such modifications as come within the ambit of the accompanying claims.

I claim:—

1. Heat transfer apparatus for fluids comprising a chest, tubes arranged in parallel nests in said chest, means for causing heating fluid to flow through said chest, a self-contained pump for driving the fluid to be heated through the tubes, means for continually wiping the heating surface of the tubes and means for driving said wiping means.

2. Heat transfer apparatus for fluids comprising parallel heated tubes, rotating members in said tubes, blades projecting from said rotating members and a means for pressing the blades outwards against said tubes, said blades providing a large number of passages of small area by which fluid passes along the inner walls of said tubes.

3. Heat transfer apparatus for fluids comprising a chest, tubes arranged in parallel nests in said chest, a pump mounted in said chest for driving the fluid to be heated through the tubes, means for continually wiping the inner surface of the tubes, and means for driving said wiping means.

4. Heat transfer apparatus for fluids comprising parallel heated tubes, rotating members in said tubes, blades projecting from said rotating members and means for pressing the blades outwards against said tubes, said blades providing a large number of passages of small area by which fluid passes along the inner walls of said tubes, and a self-contained pump for driving fluid to be heated through said tubes.

5. Heat transfer apparatus for fluids comprising a chest, tubes arranged in parallel nests in said chest, ribbed members in said tubes in contact with the inner surfaces thereof, a self-contained pump for driving the fluid to be heated through said tubes and a motor for driving said pump and for continually wiping said ribbed members against the inner surfaces of said tubes.

In testimony whereof I affix my signature.

CECIL WHEATLEY STANCLIFFE.